Figure 1:
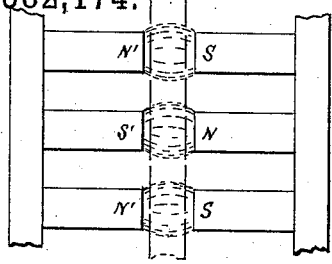

(No Model.)

R. MACKIE.
ARMATURE FOR DYNAMO ELECTRIC MACHINES.

No. 382,174. Patented May 1, 1888.

Attest:—
A. A. Connolly.
J. B. McGirr.

Robb Mackie,
Inventor.
by Thos. J. McSighe.
Attorney

UNITED STATES PATENT OFFICE.

ROBB MACKIE, OF TROY, NEW YORK, ASSIGNOR TO JOHN B. TIBBITTS, OF SAME PLACE.

ARMATURE FOR DYNAMO-ELECTRIC MACHINES.

SPECIFICATION forming part of Letters Patent No. 382,174, dated May 1, 1888.

Application filed May 9, 1887. Serial No. 237,606. (No model.)

*To all whom it may concern:*

Be it known that I, ROBB MACKIE, a citizen of the United States, residing at Troy, in the county of Rensselaer and State of New York, have invented certain new and useful Improvements in Armatures for Dynamo-Electric Machines; and I do hereby declare the following to be a full, clear, and exact description of the invention, such as will enable others skilled in the art to which it appertains to make and use the same.

This invention relates to the construction of the armatures of dynamo-electric machines—armatures of that class known as "disk" armatures—wherein the generating-coils are wound in the plane of rotation and revolve in a multipolar field. Latterly such armatures have been made without iron cores. I have discovered that in this class of machine the magnetic field is weakened by the revolution of the armature therein, the strength of field being inversely proportional to the speed of rotation. I find upon careful investigation that this weakening is caused by the reaction of the armature-current upon the lines of force, causing them to short-circuit from each pole to the adjacent poles of opposite polarity on the same frame, instead of passing all through the armature, as they should, to the facing pole of opposite polarity, and thus producing an intense field. I find, also, that this short-circuiting and its resultant loss increase very considerably with increase of distance between the facing poles, and also with the speed of rotation. My investigations have led me to the conclusion that there is no advantage gained by the absence of iron from such class of armatures unless the armature is very thin and the distance between facing poles about one-quarter the distance between adjacent poles. Such a proportion, however, does not give economical construction. I am aware that iron has been used in armatures of this class in some of the earlier machines. They have been sometimes constructed with the coils wound upon iron cores attached to solid iron disks or frames, the whole making up one substantially continuous mass of iron. With such construction the magnetization and demagnetization due to the rapid changes of magnetic influence of the field-poles when in action were not as rapid as the changes of position relatively to opposite polar fields, and the core would become heated to such an extent as to damage the insulation of the armature-conductor, and the loss of power due to the generation of local currents in the mass of iron and the heat caused thereby were excessive; but this heating and waste of power are very greatly reduced when the changes of magnetism in the core or armature take place as rapidly as the changes of relative position of armature-cores to the field-poles.

Figure 2:
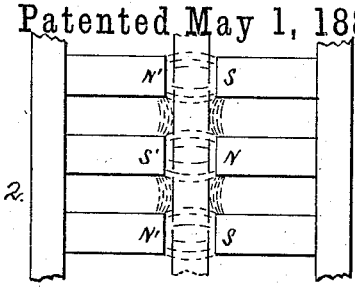

In the case of the ironless armature I find that the field of magnetic force may be delineated about as in Fig. 1, where S N S are the respective poles at one side, and N' S' N' those at the other side, facing, the armature being designated by dotted lines—this when the field-magnets are excited and the armature either in a state of rest or revolving on open circuit; but as soon as the armature revolves with its circuit properly closed the lines of force take somewhat the position shown in Fig. 2, and the leakage or short-circuiting of magnetism becomes vigorous and very serious, increasing with the speed of rotation, and I find that with a given mass and excitation of field the loss by this leakage is increased with the distance between facing poles, the proportion being about as the cube of the distance widened. To overcome this leakage across between adjacent poles, to secure concentration with uniform distribution of the lines of force between opposite poles by the use of iron cores, and to reduce the heating thereof and the waste of power are among the objects of my present invention.

The invention briefly consists in constructing a disk-armature with laminæ of iron arranged and constructed as hereinafter fully described and claimed.

Figure 3:
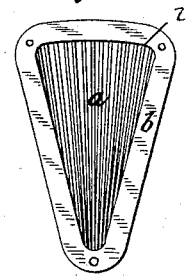
Figure 4:
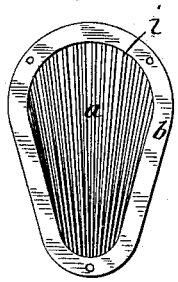
Figure 5:
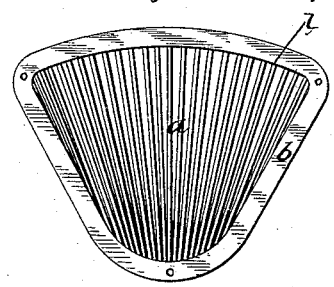
Figure 6:
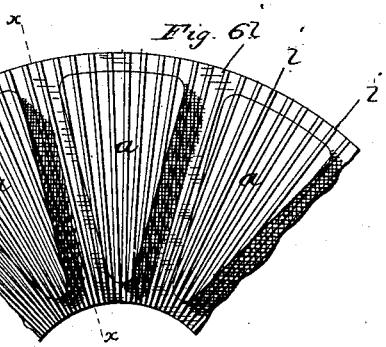
Figure 7:
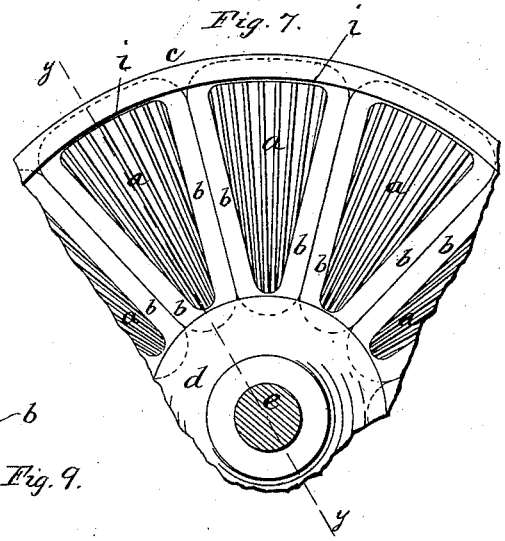
Figure 8:
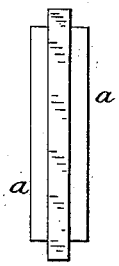
Figure 9:
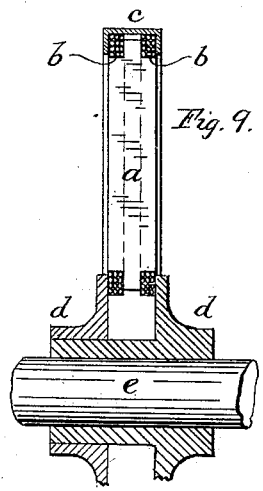

In the drawings, Figures 1 and 2 are diagrams hereinbefore referred to. Figs. 3, 4, and 5 are front or face views of armature-coils of various shapes, constructed according to the present invention. Figs. 6 and 7 are front or face views of sections of armature, showing my invention. Figs. 8 and 9 are respectively sections through lines $x\,x$ and $y\,y$ of Figs. 6 and 7.

In Figs. 3, 4, and 5 the cores $a$ are made up of strips, *i*, of soft iron, alternated with paper, mica, or other suitable material, and are then inserted in the coils *b;* or the cores *a* can be constructed in a former, and the coils afterward wound upon them, as desired. The iron strips *i*, or laminæ, are so spaced and packed as to be radial, or substantially radial.

This radial arrangement of the iron plates has a special advantage in itself. If the plates lie parallel with one another in a plane of the shaft, a triangular-shaped coil will have a greater mass of iron toward the circumference, where the coil cuts the lines of force at a higher rate of speed than at the inner part, where the speed is slower. This results in a distortion of the magnetic field and produces injurious sparking at the brushes. By my radial arrangement, on the contrary, I distribute the total mass of iron in the core so as to have its greatest density nearest the shaft, where the speed is lowest, and gradually thinning out in density toward the circumference, where the speed is greatest. I thus obtain an average density inversely proportioned approximately to the speed at any point, with the result that all distortion of the field is obviated.

In the form shown by Figs. 6, 7, 8, and 9 the construction is an annular disk or flat ring, made up of plates, *i*, of iron magnetically insulated from each other, with the plates in the plane of the shaft and radiating in a general manner therefrom. They are held in place partly by the coils *b*, which, in turn, are held by suitable clamping devices, such, for instance, as the external flanged clamp *c* and the hub-clamps *d* upon the shaft *e*. The plates are cut out and grouped in such a manner as to allow the coils to slip over the projecting parts so that the radial parts of the coils will fall into the grooves, while the laminæ of the iron core and insulating material fill up the center of the coils. These cores are so spaced as to allow the adjacent sides of two coils to rest therein, as in Fig. 7. The projections are upon both faces of the disk, and two or more sets of coils can be slipped over the projections and connected in series, multiple, or otherwise, as desired. The two sets of coils may correspond in relative position or they may not. For certain classes of machines I prefer that they should lap over one another—that is, the center of the coils in one set being opposite the space between the coils in the other set.

I do not confine myself to the exact arrangements of plates or laminæ herein described, as considerable variation may be made without departing from the spirit of my invention.

What I claim as my invention is—

1. A disk armature having its coils wound in the plane of rotation, the cores of which coils are composed of iron plates arranged in substantially radial lines, as shown, whereby the magnetic density is greatest at the part of the core nearest the axis of the armature.

2. A disk armature having its coils wound in the plane of rotation and of triangular form and the cores thereof constructed of iron plates arranged in substantially radial planes, substantially as set forth.

3. A disk armature having coils of triangular form and wound in the plane of rotation, having cores constructed of iron plates arranged in substantially radial planes and insulated magnetically from one another, substantially as described.

4. In an armature for dynamo electric machines or electric motors, the core or body built up of iron plates circumferentially discontinuous, insulated from each other, and formed with projections in the plane of the shaft adapted to receive coils of wire or a conductor, substantially as described.

5. An armature having coils wound in the plane of rotation, cores composed of alternate plates of iron and insulating material, and clamping devices uniting the whole arranged at the circumference and about the center, substantially as described.

In testimony that I claim the foregoing I have hereunto set my hand this 28th day of February, 1887.

ROBB MACKIE.

Witnesses:
 ROBT. K. BROWN, Jr.,
 J. B. WILLIAMS.